United States Patent
Kang et al.

(10) Patent No.: US 9,036,485 B2
(45) Date of Patent: May 19, 2015

(54) METHOD AND APPARATUS FOR PERFORMING CLIENT COOPERATION TRANSMISSION THROUGH A GROUP RESOURCE ALLOCATION SCHEME IN A WIRELESS ACCESS SYSTEM

(75) Inventors: Seunghyun Kang, Anyang-si (KR); Dong-Guk Lim, Anyang-si (KR); Han-Gyu Cho, Anyang-si (KR); Kyujin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 13/807,689

(22) PCT Filed: Jun. 29, 2011

(86) PCT No.: PCT/KR2011/004742
§ 371 (c)(1),
(2), (4) Date: Dec. 28, 2012

(87) PCT Pub. No.: WO2012/002722
PCT Pub. Date: Jan. 5, 2012

(65) Prior Publication Data
US 2013/0107848 A1 May 2, 2013

Related U.S. Application Data

(60) Provisional application No. 61/359,797, filed on Jun. 29, 2010.

(51) Int. Cl.
*G01R 31/08* (2006.01)
*H04W 4/00* (2009.01)
*H04W 72/04* (2009.01)
(Continued)

(52) U.S. Cl.
CPC ............... *H04W 72/04* (2013.01); *H04B 7/026* (2013.01); *H04W 48/08* (2013.01); *H04W 72/121* (2013.01); *H04L 1/0031* (2013.01); *H04W 4/08* (2013.01)

(58) Field of Classification Search
USPC ................................................. 370/241, 329
See application file for complete search history.

(56) References Cited

U.S. PATENT DOCUMENTS

2009/0161554 A1* 6/2009 Agarwal et al. ............... 370/241
2011/0216681 A1* 9/2011 Tao et al. ...................... 370/311
(Continued)

FOREIGN PATENT DOCUMENTS

| KR | 10-2005-0123041 | 12/2005 |
| KR | 10-2008-0030905 | 4/2008 |
| KR | 10-2008-0111681 | 12/2008 |
| KR | 10-2010-0010498 | 2/2010 |

*Primary Examiner* — Omar Ghowrwal
*Assistant Examiner* — Angel Brockman
(74) *Attorney, Agent, or Firm* — Lee, Hong, Degerman, Kang & Waimey (57) ABSTRACT

The present description relates to a method for performing client cooperation transmission through a group resource allocation (GRA) scheme in a wireless access system, comprising the following steps: receiving a group configuration message, including client group information, from a base station, wherein said group configuration message further includes client cooperation-enabled information that indicates whether or not the client group is concerned with the client cooperation transmission; determining whether or not to participate in the client cooperation by means of the client cooperation-enabled information; and transmitting the result of the determination on whether or not to participate in the client cooperation to the base station.

11 Claims, 10 Drawing Sheets

| (51) | Int. Cl. | |
|---|---|---|
| | H04B 7/02 | (2006.01) |
| | H04W 48/08 | (2009.01) |
| | H04W 72/12 | (2009.01) |
| | H04L 1/00 | (2006.01) |
| | H04W 4/08 | (2009.01) |

(56) References Cited

U.S. PATENT DOCUMENTS

2012/0099556 A1\* 4/2012 Kim et al. ............... 370/329
2013/0121234 A1\* 5/2013 Shrivastava et al. ......... 370/312

\* cited by examiner

METHOD AND APPARATUS FOR PERFORMING CLIENT COOPERATION TRANSMISSION THROUGH A GROUP RESOURCE ALLOCATION SCHEME IN A WIRELESS ACCESS SYSTEM

CROSS-REFERENCE TO RELATED APPLICATIONS

This application is the National Stage filing under 35 U.S.C. 371 of International Application No. PCT/KR2011/004742, filed on Jun. 29, 2011, which claims the benefit of U.S. Provisional Application Ser. No. 61/359,797, filed on Jun. 29, 2010, the contents of which are all hereby incorporated by reference herein in their entirety.

BACKGROUND ART

1. Field of the Invention

The present invention relates to a wireless access system for performing client cooperation transmission, and more particularly, to a method and apparatus for performing client cooperation transmission through a group resource allocation (GRA) scheme.

2. Related Art

A group resource allocation (GRA) scheme is a method of allocating resources to several users (i.e., terminals) belonging to one group to decrease an overhead of a control message transmitted by a base station (BS) to the terminal.

By using the GRA scheme, the BS can transmit control information, which is reported to the terminals when allocating the resources individually to the terminals, by compressing the control information in a group unit. Therefore, a signaling overhead can be decreased in a network.

The BS can use group control information to allocate and configure resources to one or more terminals belonging to one group. In this case, the group control information can be called an advanced MAP or an A-MAP. Regarding user-specific control information for a single user or a user group, multiple information elements are coded individually for the A-MAP. In addition, the A-MAP is transmitted by being cyclic redundancy check (CRC)-masked with a terminal identifier (ID) (e.g., an STID of a specific terminal, a broadcast STID, and/or a multicast STID).

Since the A-MAP is transmitted by being individually encoded and masked with the STID, the terminal performs blind decoding on an area in which the A-MAP is transmitted in order to confirm a presence/absence of an A-MAP transmitted to the terminal itself. In this case, the terminal can detect the A-MAP by using the STID assigned to the terminal itself, the broadcast STID, and/or the multicast STID (e.g., a group ID, a persistent ID, a sleep/idle mode ID, an MBS ID, etc.).

The terminal performs blind decoding on the basis of a MAP size used in a corresponding system. In this case, the BS and/or the terminal can limit the MAP size or type to a specific size and a specific type in order to decrease the number of blind decoding attempts. For example, the BS and/or the terminal can limit a size of an A-MAP information element (IE) to either three types of sizes, i.e., 56 (or 64), 96, and 144 bits or to two types of sizes, i.e., 56 (or 64) and 96 bits.

A case is assumed in which one minimum A-MAP logical resource unit (MLRU) consists of 48 data sub-carriers, two MLRUs consist of 96 data sub-carriers, and a size of the A-MAP IE is determined to 56 or 96. In this case, by using an encoding scheme (e.g., tail-biting convolutional coding (TBCC) or puncturing) for a downlink control channel, the BS can transmit A-MAP IEs by mapping a 56-bit A-MAP IE to one MLRU and by mapping a 96-bit A-MAP IE to two MLRUs.

SUMMARY OF THE INVENTION

The present invention provides information for reporting to a terminal participating in client cooperation transmission that a terminal group included in a group configuration message is a terminal group for the client cooperation transmission by using a group resource allocation (GRA) scheme.

The present invention also provides a method for transmitting terminal pairing information to a terminal to indicate at least one pairing terminal existing in a client cooperation group.

The present invention also provides a method for decreasing the number of blind decoding attempts, performed by a terminal performing client cooperation transmission, to receive a resource allocated to a client cooperation group.

This disclosure provides a method for performing client cooperation (CC) transmission through a group resource allocation (GRA) scheme in a wireless access system. The method includes receiving a group configuration message including terminal group information from a base station, the group configuration message further including CC enabled information that indicates whether the terminal group is related to the CC transmission, determining whether to participate in the CC by means of the CC enabled information, and transmitting the result of the determination on whether to participate in the CC to the base station.

In addition, the method may further include transmitting a response indicating a reception confirmation for the group configuration message to the base station.

In addition, the result of the determination on whether to participate in the CC may be an acknowledgement (ACK) or a non-ACK (NACK).

In addition, the method may further include receiving, from the base station, control information for allocating a resource to the terminal group for the CC transmission.

In addition, the control information may further include terminal pairing information indicating at least one pairing terminal including a first terminal requesting CC in the CC group and at least one second terminal accepting the CC in the CC group.

In addition, the terminal pairing information may be configured with a user bitmap index or a CC user bitmap of the first terminal and the second terminal.

In addition, the CC user bitmap may have a size corresponding to the number of terminals existing in the CC group, and bit values indicating locations of the first terminal and the second terminal may be set to '1' or '0'.

In addition, if the terminal pairing information is configured with the CC user bitmap, the control information may further include indication information indicating the first terminal in each terminal pairing.

In addition, the indication information may be expressed in a bitmap format.

In addition, the control information may be a GRA advanced-MAP (A-MAP) information element (IE) or a CC_GRA A-MAP IE.

In addition, the control information may be cyclic redundancy check (CRC)-masked with a group identifier (ID) and a masking value, and the masking value may be configured with a 1-bit masking prefix and a 3-bit message type indicator.

In addition, the masking value may be any one value selected from '0010' to '0111'.

In addition, the method may further include selecting at least one pairing terminal for performing CC transmission if the terminal group is a terminal group for the CC transmission, and transmitting information regarding the selected pairing terminal to the base station.

In addition, this disclosure provides a method for performing CC transmission through a group resource allocation (GRA) scheme in a wireless access system. The method includes creating a CC group for the CC transmission, transmitting a group configuration message including information on the created CC group to a terminal, and receiving from the terminal a response regarding whether to participate in the CC transmission. The group configuration message further includes CC enabled information indicating that the created CC group is a terminal group regarding the CC transmission.

In addition, the response regarding whether to participate in the CC may be an acknowledgement (ACK) or a non-ACK (HACK).

In addition, the method may further include transmitting control information for allocating a resource to the created CC group.

In addition, the control information may further include terminal pairing information indicating at least one pairing terminal including a first terminal requesting CC in the created CC group and at least one second terminal accepting the CC in the created CC group.

In addition, this disclosure provides a terminal performing CC transmission using a GRA scheme in a wireless access system. The terminal includes a radio frequency (RF) unit for transmitting and receiving a radio signal with respect to an external element, and a controller coupled to the RF unit. The controller controls the RF unit to receive a group configuration message including terminal group information from a base station, wherein the group configuration message further includes CC enabled information that indicates whether the terminal group is related to the CC transmission, to determine whether to participate in the CC by means of the CC enabled information; and to transmit the result of the determination on whether to participate in the CC to the base station.

According to the present invention, client cooperation transmission can be effectively performed by providing information on a client cooperation group to terminals performing the client cooperation transmission.

In addition, by performing cyclic redundancy check (CRC) masking on an advanced-MAP (A-MAP) information element (IE), which includes resource information allocated to a client cooperation group, with a newly defined value, the number of blind decoding attempts of a terminal performing client cooperation transmission can be decreased.

BRIEF DESCRIPTION OF THE DRAWINGS

FIGS. 3A and B show a concept of client cooperation transmission according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e.

The UTRA is a part of a universal mobile telecommunication system (UMTS).

$3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

For clarity, the following description will focus on IEEE 802.16m. However, technical features of the present invention are not limited thereto.

Figure 1:
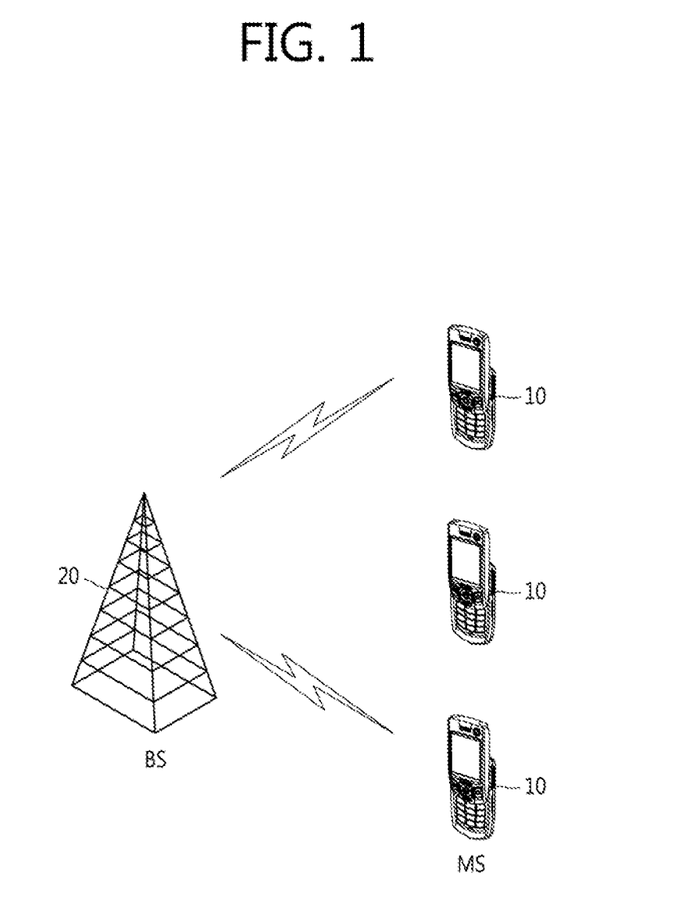
FIG. 1 shows a wireless communication system according to an exemplary embodiment of the present invention.

FIG. 1 shows a wireless communication system according to an exemplary embodiment of the present invention. The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc.

In addition, if the wireless communication system of FIG. 1 supports client cooperation communication, the MS 10 conceptually includes a client cooperation request MS for requesting client cooperation, a client cooperation accept MS for accepting the client cooperation, a cooperation participation MS for participating in the client cooperation, etc.

Client cooperation communication will be described below with reference to FIG. 3 and FIG. 4.

The BS 20 is generally a fixed station that communicates with the MS 10 and may be referred to as another terminology, such as a node-B, a base transceiver system (BTS), an access point, etc. There may be one or more cells within the coverage of the BS 20.

The wireless communication system may be a system based on orthogonal frequency division multiplexing (OFDM)/orthogonal frequency division multiple access (OFDMA). The OFDM uses a plurality of orthogonal subcarriers. The OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

In addition, a slot is a minimum possible data allocation unit, and is defined with a time and a subchannel. In an uplink, a plurality of tiles may constitute the subchannel. Six tiles may constitute the subchannel. In the uplink, three OFDM symbols and one subchannel may constitute one burst.

In case of partial usage of subchannels (PUSC) permutation, each tile may include four contiguous subcarriers on three OFDM symbols. Optionally, each tile may include three contiguous subcarriers on three OFDM symbols. A bin includes 9 contiguous subcarriers on an OFDM symbol. A band denotes a group of four rows of the bin. Six contiguous bins constitute an adaptive modulation and coding (AMC) subchannel in the same band.

Figure 2:
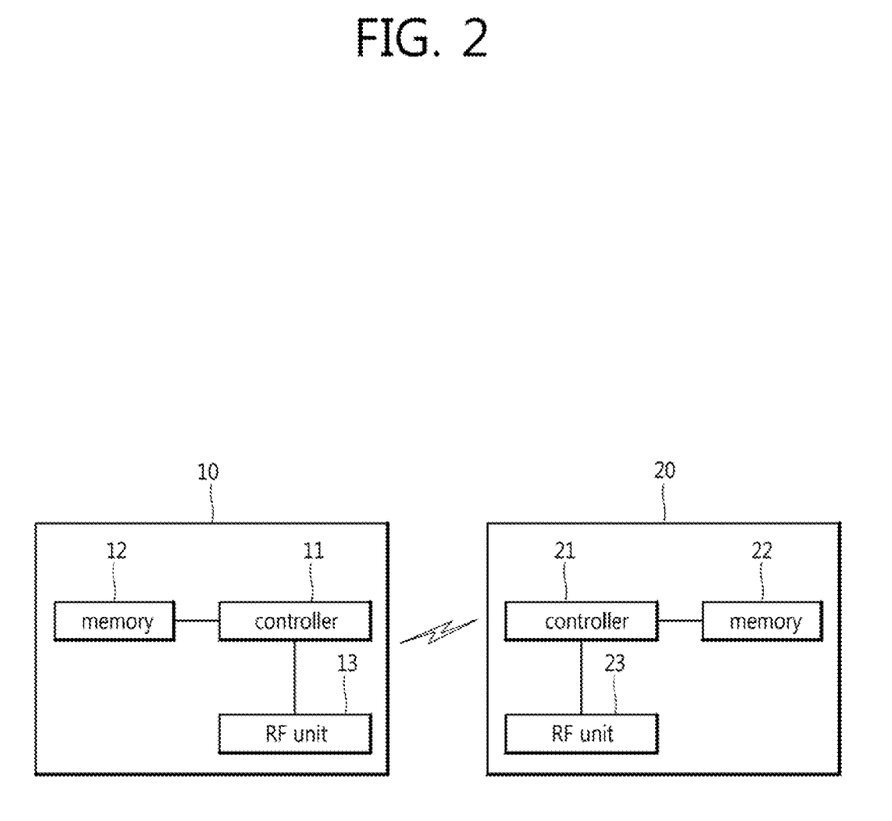
FIG. 2 is a block diagram showing internal structures of an MS and a BS in a wireless access system according to an embodiment of the present invention.

FIG. 2 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal. In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

FIGS. 3A and B show a concept of client cooperation transmission according to an embodiment of the present invention.

Figure 3:
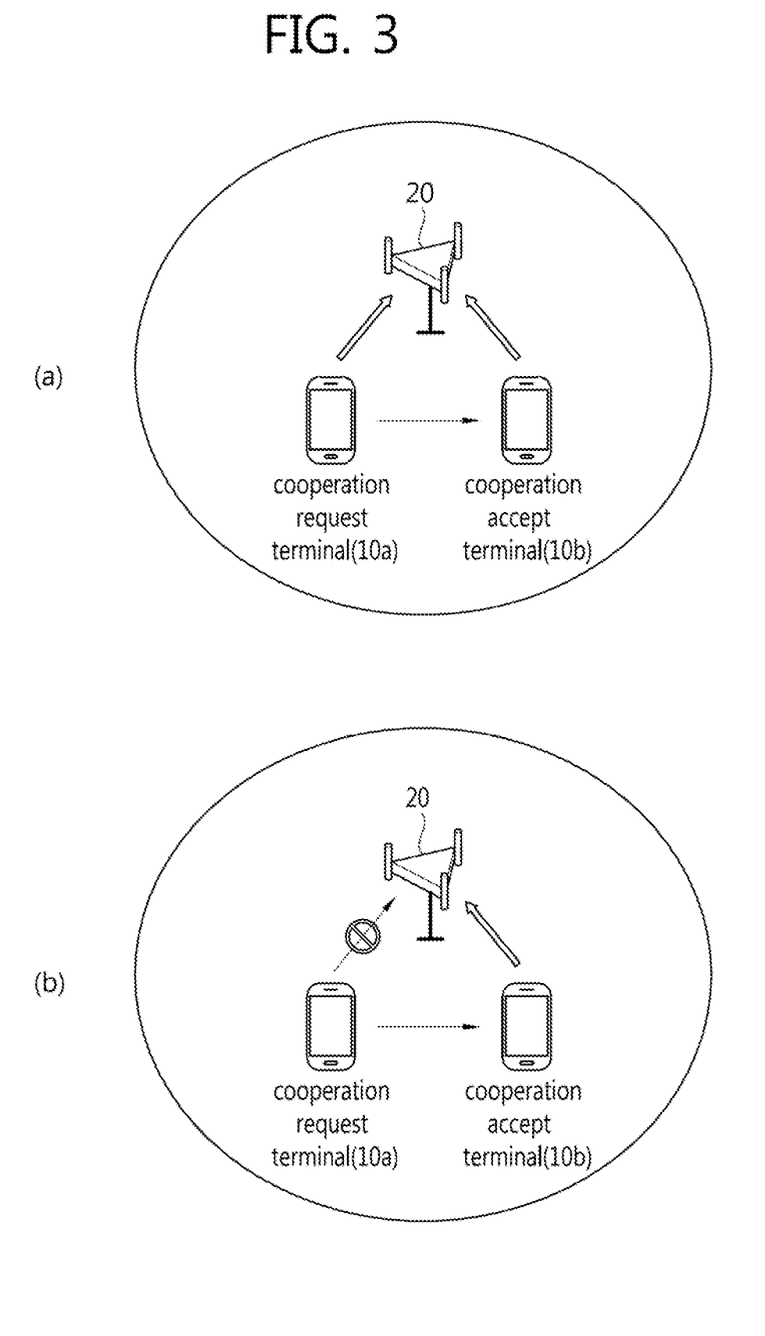

Referring to FIG. 3, a BS 20 and terminals are present. In this case, due to a reason of a poor channel state, an insufficient resource allocation, or the like, a terminal 10a may request cooperation with another terminal 10b, and in response to the cooperation request, the terminal 10b may transmit data of the terminal 10a to the BS 20.

In this case, as shown in FIG. 3, a terminal requesting the cooperation is called a cooperation request terminal, and a terminal responding to the cooperation is called a cooperation terminal.

The cooperation request terminal can also be called a cooperation subject terminal. The cooperation terminal can also be called a cooperative transmission terminal or a cooperated terminal.

In addition, it is shown in FIG. 3 that the number of cooperation terminals 10b which transmit the data of the terminal 10a in response to the cooperation is 1. As such, when the number of cooperation terminals 10b is limited to 1, there is an advantage in that a processing delay is decreased, and implementation becomes relatively simple. However, since the number of terminals is small, an attainable combining gain is low. In addition, since a link or channel state (or quality) between the cooperation terminal 10b and the BS 20 may not be good, a transfer success rate may be relatively low.

It is shown in FIG. 3A that the terminal 10a requesting the cooperation transmits its data to the terminal 10b, and also transmits the data to the BS 20. In addition, when the terminal 10b transmits the data to the BS 20, the BS can additionally acquire a combining gain.

On the other hand, it is shown in FIG. 3B that, when the terminal 10a requesting the cooperation transmits its data to the terminal 10b, the data is not transmitted to the BS 20.

For another example, due to a reason of a poor channel state, an insufficient resource allocation, or the like, the terminal 10a may request the cooperation to the terminal 10b. Then, the terminal 10b may request the cooperation to a different terminal, and the different terminal may request the cooperation to another different terminal Herein, among several terminals, only one terminal may respond to the cooperation request to transmit the data of the terminal 10a to the BS 20, or one or more terminals may respond to the cooperation request to transmit the data of the cooperation request terminal 10a to the BS 20.

Herein, the remaining terminals other than the cooperation request terminal correspond to a cooperation participation terminal, and a terminal which participates in the cooperation and thus actually transmits data corresponds to a cooperative transmission terminal.

In addition, the cooperation request terminal may also transmit its data to the BS, and the cooperative transmission terminal may also transmit data of the cooperation request terminal to the BS 20.

Figure 4:
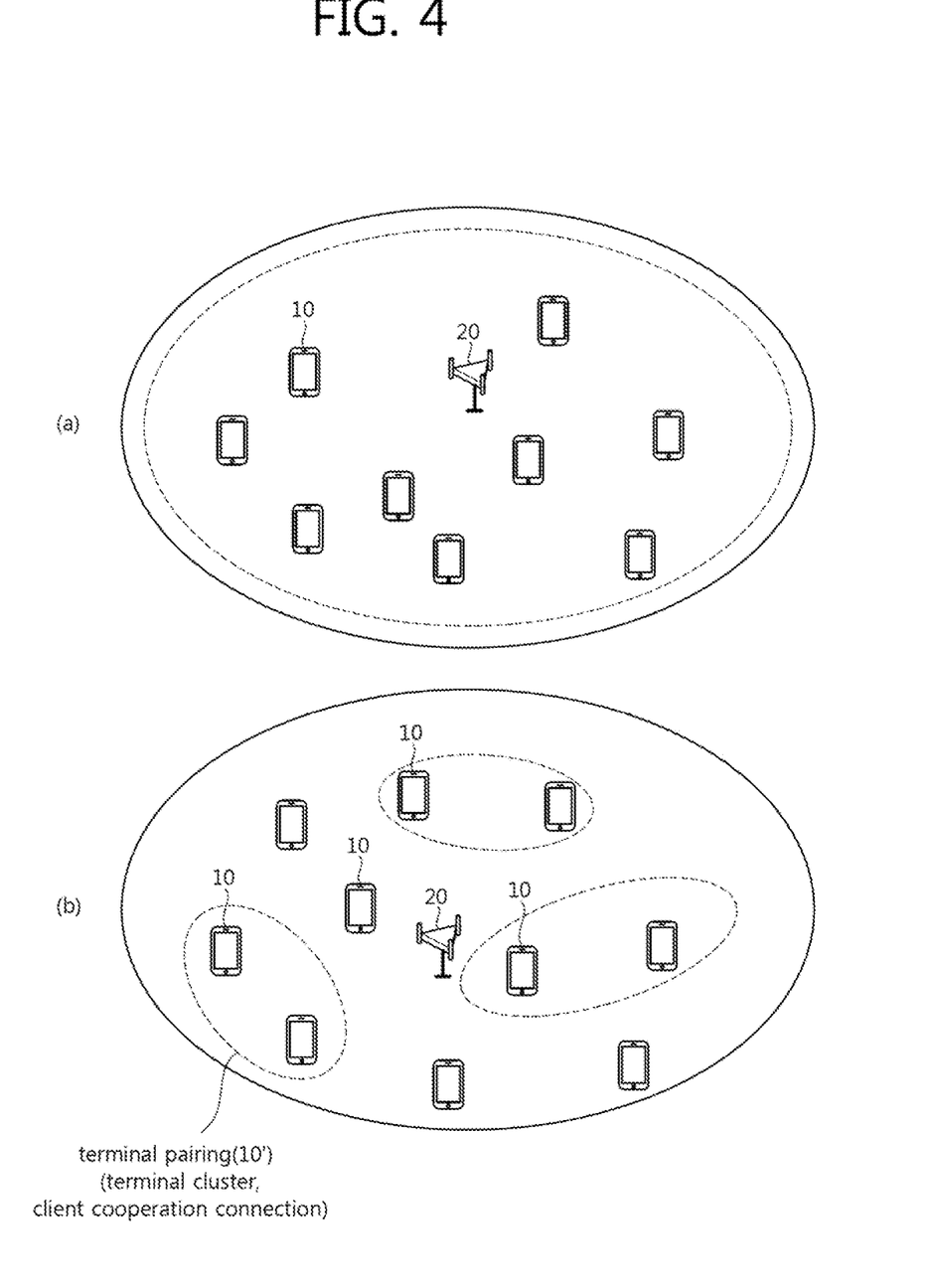
FIG. 4 shows a concept of a cooperative cluster of terminals according to an embodiment of the present invention.

FIG. 4 shows a concept of a cooperative cluster of terminals according to an embodiment of the present invention.

According to an operation and a role, the terminals can be classified into a non-cooperative terminal, a cooperation-capable terminal, a cooperation participation terminal, a cooperative transmission terminal, a cooperation request terminal, etc. The non-cooperative terminal may also be called a single transmission terminal.

In addition, the cooperation-capable terminal may also be called a cooperation terminal candidate. The cooperation request terminal may also be called a cooperation subject terminal. The cooperative transmission terminal may also be called a cooperation terminal or a cooperated terminal.

As described above, the cooperation participation terminal is a terminal which participates in cooperation transmission but does not transmit data to the BS. In this case, a terminal which accepts the cooperation request may also be called a cooperation accept terminal. The cooperation accept terminal includes both of the cooperative transmission terminal (or cooperation terminal) and the cooperation participation terminal.

The cooperation-capable terminal can be grouped into a virtual group called a cooperative cluster 10' as shown in FIG. 4. Herein, the cooperative cluster 10' can be expressed in such a term as a client cooperation connection, terminal pairing, etc.

More specifically, the cooperative cluster 10' may include all cooperation-capable terminals as shown in FIG. 4A, or may include cooperation-capable terminals on the basis of geometry information as shown in FIG. 4B.

The cooperative cluster 10' can be created by the BS when the terminal enters the coverage of the BS (namely, a network entry), or can be created when a direct cooperation relation is established between one terminal and another terminal.

If the cooperative cluster 10' is created by the BS, the BS can periodically broadcast information on the cooperative cluster. Alternatively, the information may be unicast at the request of the terminal.

If the terminals create the cooperative cluster without the aid of other elements, the terminals or any terminal can unicast or multicast the information on the cooperative cluster.

Meanwhile, it is shown in FIG. 4 that the cooperative cluster is created only for terminals belonging to a cell of one BS in the cooperation transmission.

Figure 5:
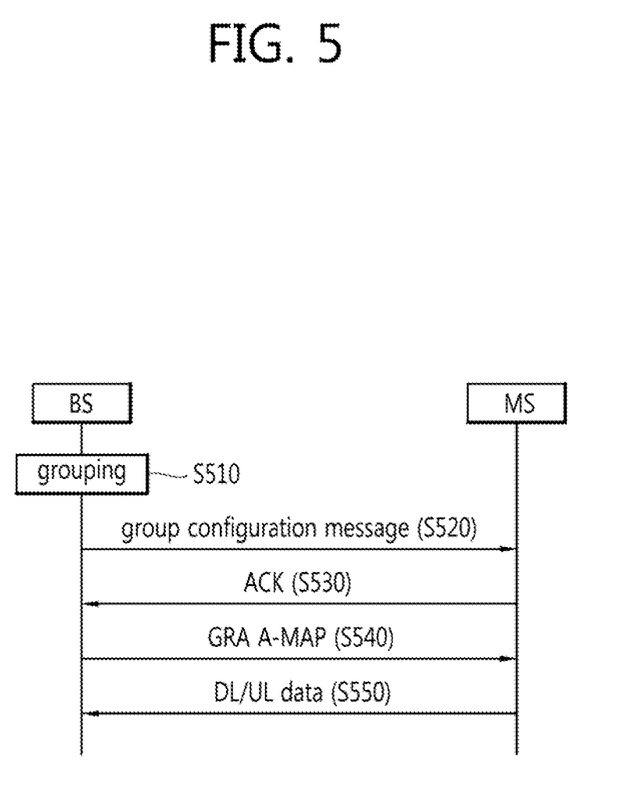
FIG. 5 shows an example of a process in which a BS transmits a signal to an MS by using typical GPA.

FIG. 5 shows an example of a process in which a BS transmits a signal to an MS by using typical GRA.

The group control information is information used to configure and allocate a resource for one or more users (or MSs) in one user group. Group scheduling requires two types of operations.

First, the BS can perform an operation of allocating one user to one group. In order to add one user to one group in a downlink or an uplink, the BS transmits to an MS a group configuration MAC management message or a group configuration MAC control message.

In addition, the BS can allocate resources to users in one group. In order to allocate the resources to one or more users in one group, the BS transmits a downlink/uplink GRA A-MAP IE to the MS.

The downlink/uplink A-MAP IE is included in user-specific resource assignment information in an A-MAP region. The GRA A-MAP IE includes a bitmap for indicating scheduled users or for signaling a resource allocation, a modulation and coding scheme (MCS), and/or a resource size.

Referring to FIG. 5, the BS performs a grouping operation for grouping MSs having similar attributes into one group according to a specific criterion (step S510). For example, MSs having the same MCS level can be grouped into one group.

Alternatively, grouping can be achieved such that a new MS is added to a group which has been already created in a downlink or an uplink, or a specific MS is deleted from the group. Each of a plurality of groups created according to the grouping uses one MIMO mode set and HARQ bust size set. A plurality of MSs belonging to one group can use a MIMO mode set and HARQ burst size set used in a corresponding group.

When the groups are created according to the determined criterion, in order to add any MS to a corresponding group among the created groups or to delete the MS from a current group to which the MS belongs, the BS transmits a group configuration message to the MS (step S520).

The group configuration message is a message transmitted for group management when the BS uses the GRA in the uplink or the downlink, and is unicast in a format of a group configuration MAC control message. The group configuration message includes a group ID indicating a group to which the MS is added or from which the MS is deleted and a user bitmap index of the user or the MS.

It is assumed hereinafter that the BS transmits the group configuration message to add the MS to a new group.

Thereafter, the MS which receives the group configuration message transmits to the BS an ACK message indicating whether the group configuration message is received, and thus the MS is assigned to a corresponding group indicated by the group configuration message (step S530).

Next, when a corresponding MS is assigned to a specific group, in order to allocate resources in a group unit, the BS transmits a group resource allocation message including information on the resources allocated in the group unit to the MS belonging to the group (step S540). The group resource allocation message is transmitted in a format of a GRA A-MAP IE, and includes bitmap information for MSs scheduled to a corresponding group by using the group configuration message and information regarding a MIMO mode used in the group, a burst size, and a resource allocation size. Thereafter, the BS can perform signal transmission and reception with the MS by using resources allocated to the MS belonging to the group according to the group resource allocation message (step S550).

When using the GRA scheme of FIG. 5, for each of the scheduled MSs, the BS selects and transmits any one burst size selected from a bust size set consisting of a plurality of burst sizes used in a corresponding group and any one resource size selected from a resource size set consisting of a plurality of resource sizes used in the corresponding group.

Figure 6:
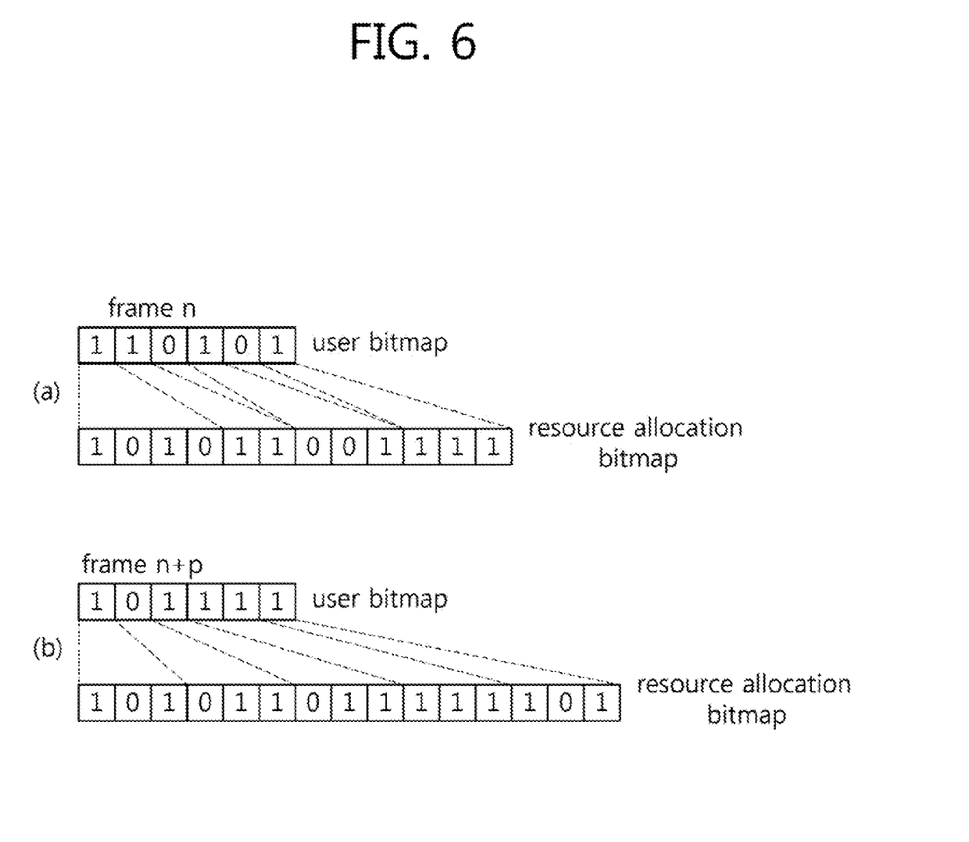
FIG. 6 shows an example of a GRA scheme using a bitmap.

FIG. 6 shows an example of a GRA scheme using a bitmap.

Bitmaps can be used to report resource allocation information to MSs belonging to a specific group. Referring to FIG. 6, a first bit map, i.e., a user bitmap, indicates which MS is scheduled at a corresponding time in a corresponding group. Bits of the user bitmap are one-to-one mapped respectively to the MSs belonging to the group. In this case, up to 6 users can be included in one group, and if each bit of the bitmap is set to '1', it indicates that a corresponding MS is a user scheduled in a current frame (i.e., a user to which a resource is allocated).

Referring to FIG. 6, $1^{st}$, $2^{nd}$, $4^{th}$, and $6^{th}$ users are scheduled in a frame n. Other MSs except for the $2^{nd}$ MS are scheduled in a frame n+p.

In this case, each MS can acquire location information indicating a location of the MS in the user bitmap from the BS when added to a group. A resource allocation bitmap indicates resource allocation information of scheduled users. The resource allocation information may include an MCS, a size of a resource to be allocated, etc.

In case of FIG. 6, information for one MS can be expressed in 3 bits. Since 4 MSs are scheduled in total in the frame n, the size of the resource allocation bitmap is 12 bits (3×4). Since 5 MSs are scheduled in the frame n+p, the size of the resource allocation bitmap is 15 bits in total. In this case, the resource allocation bitmap includes MCS information of the scheduled MS and information indicating a size of the allocated resource (e.g., the number of LRUs).

Hereinafter, a method of performing client cooperation transmission (or communication) using a GRA scheme proposed in the present invention will be described in detail.

Figure 7A:
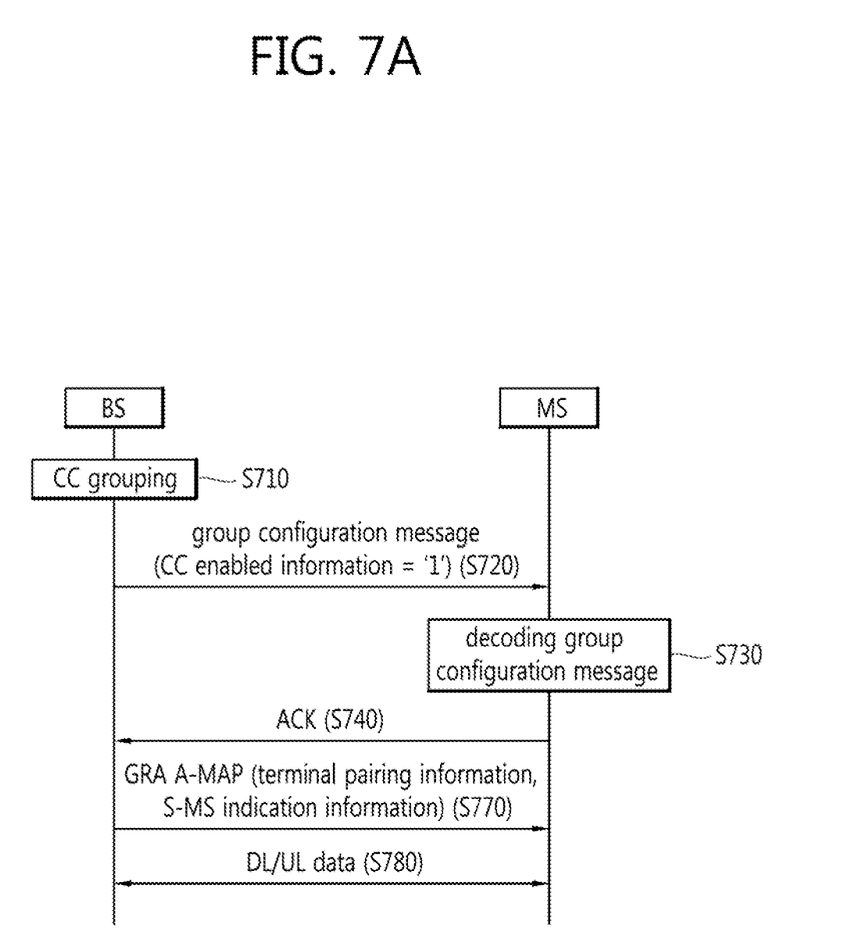
FIGS. 7A and B are flowcharts showing a method of transmitting client cooperation group information to an MS performing client cooperation communication using a GRA scheme according to an embodiment of the present invention.
Figure 7B:
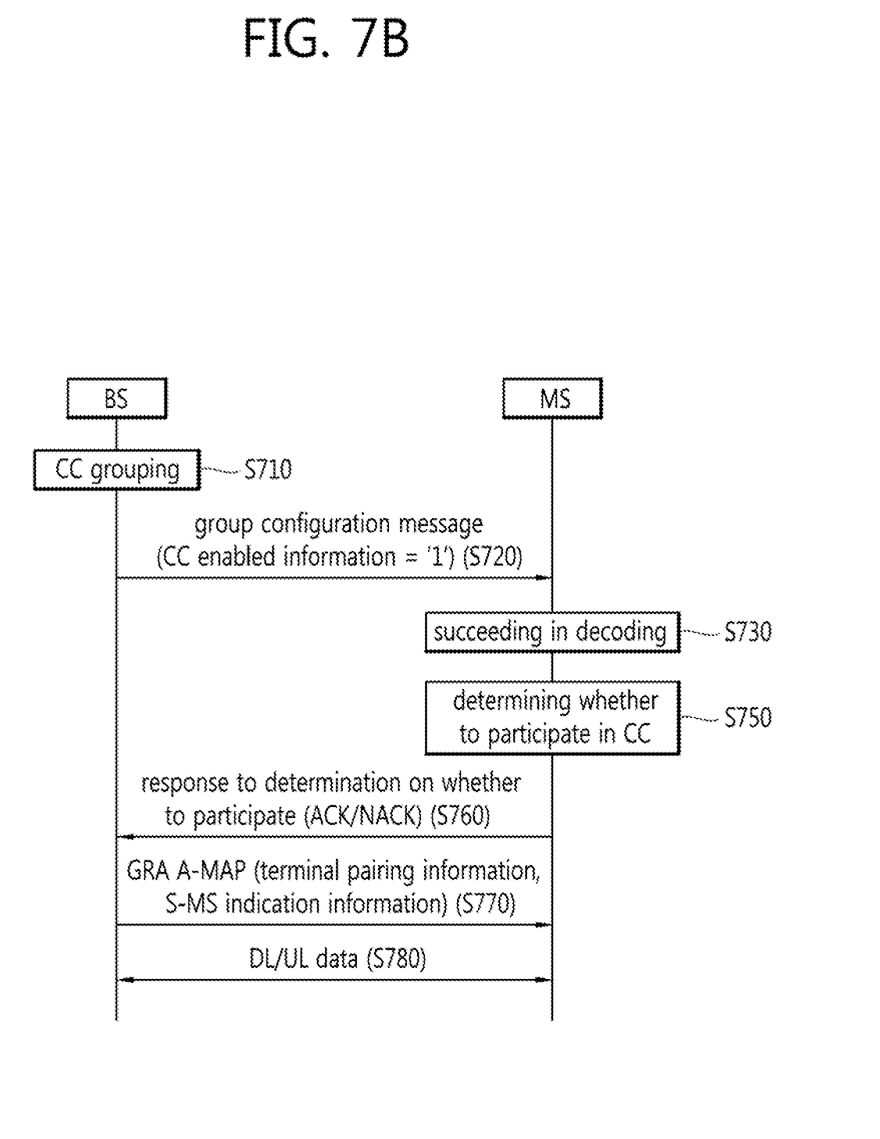

FIGS. 7A and B are flowcharts showing a method of transmitting client cooperation group information to an MS performing client cooperation communication using a GRA scheme according to an embodiment of the present invention.

First, for client cooperation (CC), a BS creates a CC group (step S710). That is, the BS allows the CC group to include an MS which desires to participate in the CC or an MS which is desired to participate in the CC.

Thereafter, the BS transmits a group configuration message including the created CC group information to the MS (step S720). Herein, the group configuration message can be received by at least one of a first MS which requests the CC and a second MS which accepts the CC.

Hereinafter, the MS requesting the CC is called the first MS, and the MS responding to (or accepting) the CC is called the second MS. As shown in FIG. 3 and FIG. 4, the first MS can also be called a CC request MS, a CC subject MS, a source-MS (S-MS), etc., and the second MS can also be called a CC accept MS, a cooperation-MS (C-MS), a cooperative transmission MS, a cooperated MS, a CC object MS.

In addition, the BS further includes CC enabled information (or field) indicating whether an MS group included in the group configuration message is an MS group regarding CC communication or an MS group regarding a typical GRA. For example, if the CC enabled information is set to '1', the CC enabled information indicates a CC group, and if it is set to '0', it indicates a typical GRA group.

In addition, the BS may transmit the group configuration message to the MS by including both of GRA group information and CC group information. In this case, indication information may be further included to indicate each piece of group information.

Thereafter, the MS decodes the group configuration message (step S730), and confirms the CC enabled information. Herein, if the group configuration message is successfully decoded, the MS transmits 'ACK' to the BS (step S740).

Alternatively, only for a case where the decoding is successful, if it is configured that an MS group included in the group configuration message is a CC group, the MS determines whether to participate in CC communication (step S750). That is, the MS determines whether to participate in CC according to a state of the MS (e.g., a 'CC disable' by a user setting, a battery state, etc.).

Thereafter, the MS transmits the determination result to the BS (step S760). That is, if the MS desires to participate in the CC, the MS transmits 'ACK' to the BS, and if the MS does not desire to participate in the CC, the MS transmits 'NACK' to the BS.

If the decoding of the group configuration message fails, the MS transmits 'ACK' to the BS (step S740).

As shown in FIGS. 7A and B, the MS receives the group configuration message, and then transmits a response thereon to the BS after performing decoding on the group configuration message (see FIG. 7A) or after determining whether to participate in the CC (see FIG. 7B).

Thereafter, the BS transmits control information including MS pairing information to the MS to indicate at least one pairing MS existing in the CC group (step S770).

Herein, the control information may be a GRA A-MAP or a CC_GRA A-MAP newly defined for the CC group.

Herein, the MS pairing information relates to information indicating pairing MSs performing CC communication, and can be expressed in a (MS) cooperative cluster and a CC connection.

Regarding the MS pairing information, one or a plurality of MS pairings can exist in the CC group. If the plurality of MS pairings exist in the CC group, the BS transmits the number of MS pairings existing in the CC group to the MS.

In addition, the MS pairing information can be expressed in a bitmap format or in a user bitmap index indicating each of the pairing MSs in the CC group.

If the MS pairing information is expressed in the bitmap index, the BS transmits user bitmap indices, in an orderly manner, corresponding to the first MS and the second MS in each MS pairing existing in the CC group.

For example, if it is assumed that MS pairings (or CC-connections) are indexed from 1 to N in the CC group, the BS transmits user bitmap indices corresponding to the first MS and the second MS in each MS pairing, as described below.

(1) CC-connection #1:(a user bitmap index of the $1^{st}$ MS, a user bitmap index of the $2^{nd}$ MS)

(2) CC-connection #2: (a user bitmap index of the $1^{st}$ MS, and a user bitmap index of the $2^{nd}$ MS)

. . .

(3) CC-connection #N: (a user bitmap index of the $1^{st}$ MS, a user bitmap index of the $2^{nd}$ MS)

If the MS pairing information is expressed in the bitmap format, bitmap index values corresponding to the first MS and the second MS can be set to '1' or '0'.

In this case, bitmap index values not corresponding to the first MS and the second MS are set to the opposite of the bitmap index values corresponding to the first MS and the second MS.

In this case, the BS transmits information corresponding to the first MS in each MS pairing in a bitmap format. That is, the BS transmits a user bitmap to the MS to distinguish the first MS and the second MS. For example, to distinguish the first MS and the second MS, a bit value of the first MS can set to '1' and a bit value of the second MS can be set to '0' when transmitted. The other way around is also possible.

For example, if it is assumed that MS pairings are indexed from 1 to N in the CC group and 16 pairing MSs exist in each MS pairing, the BS transmits a user bitmap indicating the first MS and the second MS in each MS pairing and a user bitmap indicating the first MS in each MS pairing as described below.

(1) User bitmap indicating the first MS and the second MS
CC-connection #1:0100000000000100
CC-connection #2:0000010000001000
. . .
CC-connection #N: 1000000010000000
(2) first MS in each CC connection: 1100010010001100

As described in the case (2) above, the first MS included in one CC-connection cannot be a first MS of another CC-connection. Thus, if the MS receives bitmap information in the format described in the cases (1) and (2) above from the BS, the first MS in each CC-connection can be known.

Thereafter, the BS can perform signal transmission and reception with the MS by using a resource allocated to the MS belonging to a corresponding group according to the group resource allocation message (step S780).

In addition, if the control information is a CC_GRA A-MAP newly defined for a CC group, the BS performs CRC masking on the CC-GRA A-MAP by using a CC group ID and a newly defined 4-bit masking value in order to distinguish it from a typical GRA A-MAP. Herein, the newly defined 4-bit masking value is different from a masking value used in the typical GRA A-MAP.

The 4-bit masking value is divided into a 1-bit masking prefix and a 3-bit message type indicator.

Herein, the typical GRA A-MAP uses '0' as the 1-bit masking prefix, and uses '001' as the 3-bit message type indicator.

That is, the BS performs CRC masking on the CC_GRA A-MAP by using any one of values '0010' to '0111' as a 4-bit masking value in order to distinguish it from the typical GRA A-MAP.

Figure 8A:
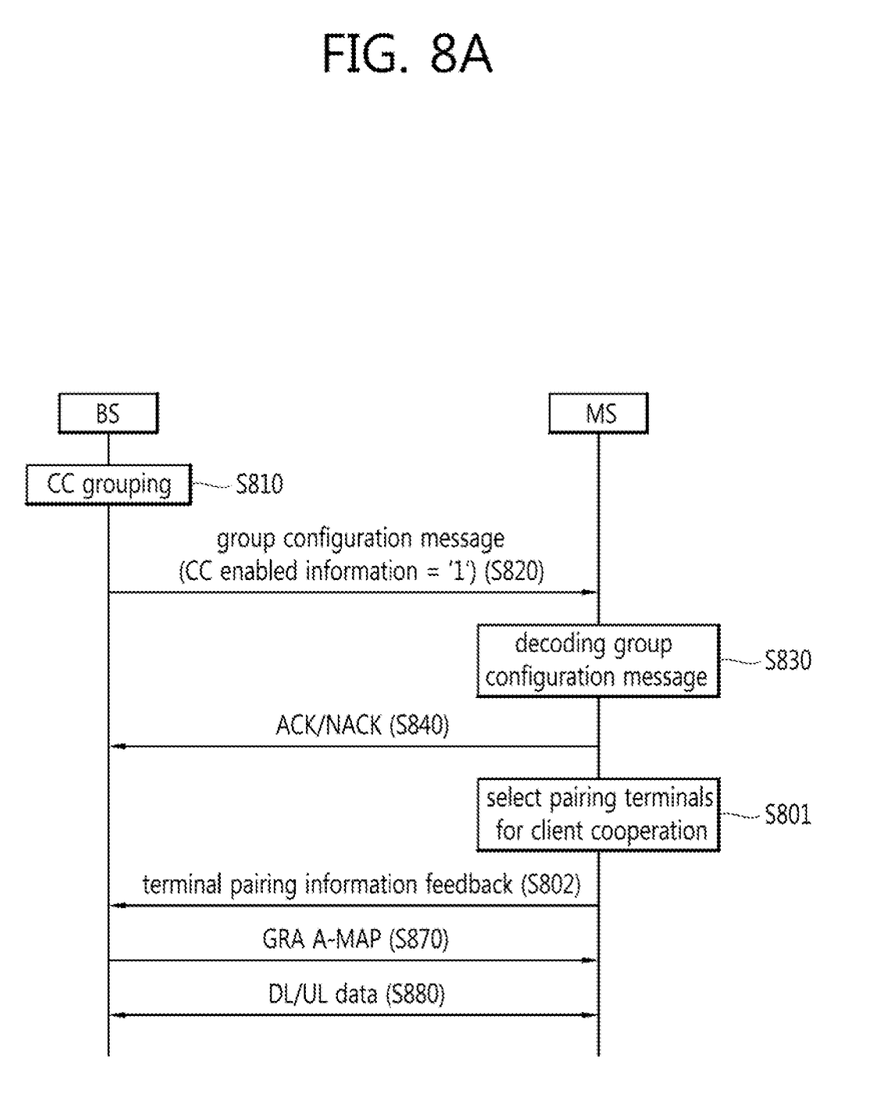
FIGS. 8A and B are flowcharts showing a method of transmitting CC group information to an MS performing CC communication using a GRA scheme according to another embodiment of the present invention.
Figure 8B:
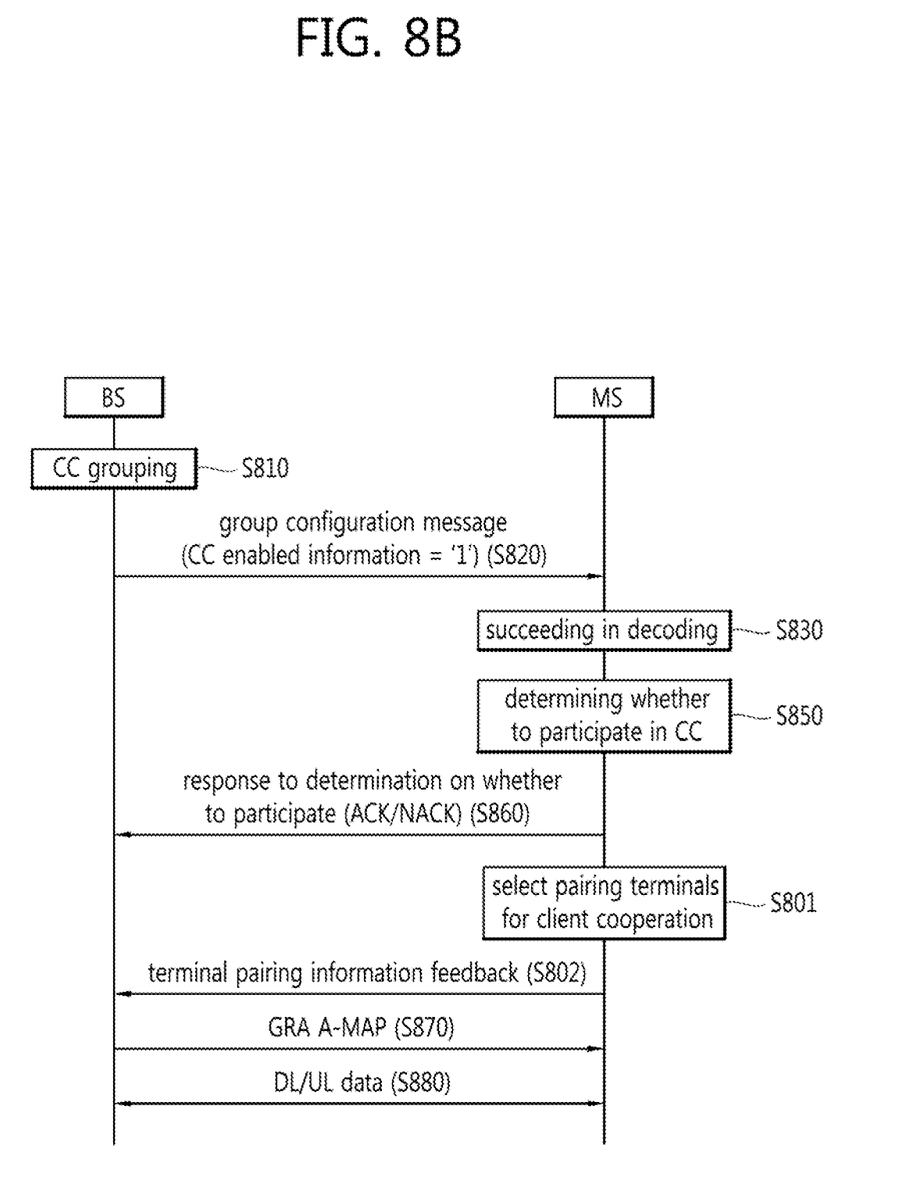

FIGS. 8A and B are flowcharts showing a method of transmitting CC group information to an MS performing CC communication using a GRA scheme according to another embodiment of the present invention.

Steps S810 to S860 and Step S880 are identical to Steps S710 to S760 and Step S780. Thus, detailed explanations thereof will be omitted, and only differentiated parts will be described in detail.

It is assumed herein that an MS has information on a channel condition with other MSs in a CC group, and has information on a channel condition between all MSs and a BS.

In order to perform the CC communication, the MS selects at least one MS pairing with the MS itself to perform CC among MSs belonging to the CC group (step S801).

Thereafter, the MS feeds back MS pairing information regarding the selected at least one pairing MS to the BS (step S802). The MS pairing information is information corresponding to the first MS and the second MS in each MS pairing.

That is, the first MS transmits (or feeds back) information indicating that it is the first MS and information of the pairing MS to the BS. Herein, the first MS can feed back a user bitmap index of the second pairing MS to the BS.

In addition, the second MS transmits (or feeds back) information indicating that it is the second MS and information of the first pairing MS to the BS. Herein, the second MS can feed back a user bitmap index of the first pairing MS to the BS.

In addition, both of the first MS and the second MS can determine bit values corresponding to their user bitmap indices and a user bitmap index of a pairing MS by using user bitmaps. Herein, both of the first MS and the second MS can feed back the user bitmap index of the first MS to the BS.

In addition, each MS can feed back a 1-bit CC-MS indicator to the BS to indicate whether it is the first MS or the second MS.

For another example, the BS can predetermine candidates of the second MS and report them to all MSs in the CC group by considering an MS class, an MS capability, and a channel condition between the BS and the MS.

That is, the BS can restrict the $2^{nd}$ MS to candidates of predetermined MSs.

What is claimed is:

1. A method for performing client cooperation (CC) transmission through a group resource allocation (GRA) scheme in a wireless access system, the method comprising:
   receiving a group configuration message including terminal group information from a base station, wherein the group configuration message further includes CC enabled information that indicates whether the terminal group is related to the CC transmission;
   determining whether to participate in the CC by means of the CC enabled information;
   transmitting the result of the determination on whether to participate in the CC to the base station; and
   receiving, from the base station, control information for allocating a resource to the terminal group for the CC transmission,
   wherein the control information further includes terminal pairing information indicating at least one pairing terminal including a first terminal requesting CC in the CC group and at least one second terminal accepting the CC in the CC group,
   wherein the terminal pairing information is configured with a user bitmap index or a CC user bitmap of the first terminal and the second terminal,
   wherein, when the terminal pairing information is configured with the CC user bitmap, the control information further includes indication information indicating the first terminal in each terminal pairing,
   wherein the indication information is expressed in a bitmap format, and
   wherein the user bitmap index or the CC user bitmap includes a modulation and coding scheme (MCS) and a size of a resource to be allocated.

2. The method of claim 1, further comprising transmitting a response indicating a reception confirmation for the group configuration message to the base station.

3. The method of claim 1, wherein the result of the determination on whether to participate in the CC is an acknowledgement (ACK) or a non-ACK (NACK).

4. The method of claim 1, wherein the CC user bitmap has a size corresponding to the number of terminals existing in the CC group, and
   wherein bit values indicating locations of the first terminal and the second terminal are set to '1' or '0'.

5. The method of claim 1, wherein the control information is a GRA advanced-MAP (A-MAP) information element (IE) or a CC_GRA A-MAP IE.

6. The method of claim 5, wherein the control information is cyclic redundancy check (CRC)-masked with a group identifier (ID) and a masking value, and
   wherein the masking value is configured with a 1-bit masking prefix and a 3-bit message type indicator.

7. The method of claim 6, wherein the masking value is any one value selected from '0010' to '0111'.

8. The method of claim 1, further comprising:
   selecting at least one pairing terminal for performing CC transmission if the terminal group is a terminal group for the CC transmission; and
   transmitting information regarding the selected pairing terminal to the base station.

9. A method for performing client cooperation (CC) transmission through a group resource allocation (GRA) scheme in a wireless access system, the method comprising:
   creating a CC group for the CC transmission;
   transmitting a group configuration message including information on the created CC group to a terminal;
   receiving from the terminal a response regarding whether to participate in the CC transmission,
   wherein the group configuration message further includes CC enabled information indicating that the created CC group is a terminal group regarding the CC transmission transmitting control information for allocating a resource to the created CC group, wherein the control information further includes terminal pairing information indicating at least one pairing terminal including a first terminal requesting CC in the created CC group and at least one second terminal accepting the CC in the created CC group, wherein the terminal pairing information is configured with a user bitmap index or a CC user bitmap of the first terminal and the second terminal,
   wherein, when the terminal pairing information is configured with the CC user bitmap, the control information further includes indication information indicating the first terminal in each terminal pairing, and wherein the indication information is expressed in a bitmap format and wherein the user bitmap index or the CC user bitmap includes a modulation and coding scheme (MCS) and a size of a resource to be allocated.

10. The method of claim 9, wherein the response regarding whether to participate in the CC is an acknowledgement (ACK) or a non-ACK (NACK).

11. A terminal performing client cooperation (CC) transmission using a group resource allocation (GRA) scheme in a wireless access system, the terminal comprising:
    a radio frequency (RF) unit for transmitting and receiving a radio signal with respect to an external element; and
    a controller coupled to the RF unit,
    wherein the controller controls the RF unit to
    receive a group configuration message including terminal group information from a base station,
    wherein the group configuration message further includes CC enabled information that indicates whether the terminal group is related to the CC transmission,
    determine whether to participate in the CC by means of the CC enabled information;
    transmit the result of the determination on whether to participate in the CC to the base station;
    receive control information for allocating a resource to the terminal group for the CC transmission,
    wherein the control information further includes terminal pairing information indicating at least one pairing terminal including a first terminal requesting CC in the CC group and at least one second terminal accepting the CC in the CC group,
    wherein the terminal pairing information is configured with a user bitmap index or a CC user bitmap of the first terminal and the second terminal,
    wherein, when the terminal pairing information is configured with the CC user bitmap, the control information further includes indication information indicating the first terminal in each terminal pairing, and wherein the indication information is expressed in a bitmap format and wherein the user bitmap index or the CC user bitmap includes a modulation and coding scheme (MCS) and a size of a resource to be allocated.

\* \* \* \* \*